United States Patent
Yoo et al.

(10) Patent No.: US 10,225,214 B2
(45) Date of Patent: Mar. 5, 2019

(54) APPARATUS, METHOD, AND COMPUTER PROGRAM FOR PROVIDING CHAT SERVICE

(71) Applicant: NAVER Corporation, Seongnam-si, Gyeonggi-do (KR)

(72) Inventors: Doo Sun Yoo, Seongnam-si (KR); Hyun Ah Hwang, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 332 days.

(21) Appl. No.: 15/145,297

(22) Filed: May 3, 2016

(65) Prior Publication Data
US 2016/0330146 A1 Nov. 10, 2016

(30) Foreign Application Priority Data
May 8, 2015 (KR) .................... 10-2015-0064852

(51) Int. Cl.
*G06F 15/16* (2006.01)
*H04L 12/58* (2006.01)
(Continued)

(52) U.S. Cl.
CPC .......... *H04L 51/04* (2013.01); *H04L 12/1822* (2013.01); *H04L 12/1827* (2013.01);
(Continued)

(58) Field of Classification Search
CPC . H04L 51/04; H04L 12/1822; H04L 12/1827; H04L 63/00; H04L 63/0421; H04W 12/02; H04W 88/02
See application file for complete search history.

(56) References Cited

U.S. PATENT DOCUMENTS

2007/0208845 A1* 9/2007 Raheman ............ H04L 63/0421
                                                                  709/223
2011/0138302 A1* 6/2011 Schleifer .......... G06F 17/30867
                                                                  715/753
(Continued)

FOREIGN PATENT DOCUMENTS

JP          5161053 B2     3/2013
KR    10-2014-0014790      2/2014
(Continued)

OTHER PUBLICATIONS

Notice of Allowance dated Apr. 7, 2016 for Korean Patent Application No. 10-2015-0064852.

*Primary Examiner* — Jonathan A Bui
(74) *Attorney, Agent, or Firm* — Harness, Dickey & Pierce, P.L.C.

(57) ABSTRACT

A method of facilitating electronic communication of a message between a plurality of accounts including a first account and a plurality of outside accounts may include determining if a number of the plurality of accounts or a ratio of the plurality accounts that approve an anonymous mode is greater than or equal to a first reference value based on first voting information received from the plurality of accounts, converting the mode of a chat room to the anonymous mode by matching each of a plurality of temporary accounts with a respective one of the plurality of accounts, if the determining determines that the number of the plurality of accounts or the ratio of the plurality accounts is greater than or equal to the first reference value; and displaying the message from an account in the chat room with an indication of the temporary account associated with the account.

20 Claims, 16 Drawing Sheets

(51) Int. Cl.
  *H04L 12/18*    (2006.01)
  *H04L 29/06*    (2006.01)
  *H04W 12/02*    (2009.01)
  *H04W 88/02*    (2009.01)
(52) U.S. Cl.
  CPC .......... *H04L 63/00* (2013.01); *H04L 63/0421* (2013.01); *H04W 12/02* (2013.01); *H04W 88/02* (2013.01)

(56) References Cited

U.S. PATENT DOCUMENTS

| | | | |
|---|---|---|---|
| 2011/0208862 A1* | 8/2011 | Maffione | H04L 67/22 709/224 |
| 2013/0042312 A1* | 2/2013 | Wickman | H04L 63/08 726/7 |
| 2013/0246525 A1* | 9/2013 | Patil | G06Q 10/107 709/204 |
| 2015/0188928 A1* | 7/2015 | Shapiro | H04L 63/105 709/206 |
| 2016/0021038 A1* | 1/2016 | Woo | H04L 51/046 709/206 |
| 2016/0165395 A1* | 6/2016 | Long | H04W 4/023 455/456.3 |

FOREIGN PATENT DOCUMENTS

| | | | | |
|---|---|---|---|---|
| KR | 10-2014-0123728 | | 10/2014 | |
| KR | 20140123728 A | * | 10/2014 | |
| WO | WO-01/31903 A1 | | 5/2001 | |
| WO | WO-2015164820 A1 | * | 10/2015 | ............. G06F 3/017 |

* cited by examiner

APPARATUS, METHOD, AND COMPUTER PROGRAM FOR PROVIDING CHAT SERVICE

CROSS-REFERENCE TO RELATED APPLICATION

This application claims the benefit of Korean Patent Application No. 10-2015-0064852, filed on May 8, 2015, in the Korean Intellectual Property Office, the disclosure of which is incorporated herein in its entirety by reference.

BACKGROUND

1. Field

One or more embodiments relate to an apparatus, a method, and/or a computer program for providing a chat service.

2. Description of the Related Art

With developments in technologies related to information communication and electronic apparatuses, users have become able to use various functions through electronic apparatuses such as desktop computers, laptop computers, or smart phones connected to a communication network such as the Internet.

These various functions may include a function of transmitting and receiving data between electronic apparatuses by a wired/wireless communication protocol. Accordingly, a chat service may allow users to transmit and/or receive multilateral messages created by their respective electronic apparatuses and display the messages on each of the electronic apparatuses.

The above-described background technology cannot be necessarily said to be well-known technology available to the general public.

SUMMARY

One or more embodiments include an apparatus, a method, and/or a computer program for providing a chat service, which may provide an anonymous mode, in which an identity of a sender who transmitted a message is not disclosed, in a process of performing a multilateral chat using messages.

One or more embodiments include an apparatus, method, and computer program for providing a chat service, which may provide in a process of performing a multilateral chat using messages, a function of converting a general mode, in which a sender who transmitted a message is disclosed, to the anonymous mode, during chatting, and converting the anonymous mode to the general mode during chatting.

Additional aspects will be set forth in part in the description which follows and, in part, will be apparent from the description, or may be learned by practice of the presented embodiments.

Some example embodiments relate to a method of facilitating electronic communication of at least a first message between a plurality of accounts including a first account and a plurality of outside accounts.

In some example embodiments, the method includes receiving a request to convert a mode of a chat room to an anonymous mode; receiving first voting information from the plurality of accounts, the first voting information indicating whether a user associated with a respective one of the plurality of accounts approves the anonymous mode; determining if a number of the plurality of accounts or a ratio of the plurality accounts that approve the anonymous mode is greater than or equal to a first reference value based on the first voting information; converting the mode of the chat room to the anonymous mode by matching each of a plurality of temporary accounts with a respective one of the plurality of accounts, if the determining determines that the number of the plurality of accounts or the ratio of the plurality accounts is greater than or equal to the first reference value; and displaying the first message from an account in the chat room with an indication of the temporary account associated with the account, if the first message is received from one of the plurality of accounts.

In some example embodiments, the method further includes creating the chat room such that the chat room facilitates the communication of the first message between the plurality of accounts.

In some example embodiments, the method further includes redistributing the plurality of temporary accounts, if a new account joins the chat room.

In some example embodiments, the redistributing includes releasing a correspondence relationship between the accounts and the plurality of temporary accounts; increasing a number of the plurality of temporary accounts; and matching each of the new account and the plurality of accounts with respective ones of the plurality of temporary accounts.

In some example embodiments, the method further includes determining whether one of the plurality of accounts exits the chat room; and setting a new correspondence relationship between each of the plurality of accounts remaining in the chat room and the plurality of temporary accounts, if one of the plurality accounts exits the chat room.

In some example embodiments, the method further includes receiving a request to terminate the anonymous mode from any one of the plurality accounts; and converting the mode of the chat room to a general mode, if the receiving receives the request to terminate the anonymous mode such that, in the general mode, when the chat service providing apparatus receives a second message from a transmitting accounting of the plurality of accounts, the chat service providing apparatus displays the second message along with an indication of the transmitting account in the chat room.

In some example embodiments, the converting includes receiving second voting information from the plurality of accounts, the second voting information indicating whether a user associated with a respective one of the plurality accounts approves terminating the anonymous mode; determining if a number of the plurality of accounts or a ratio of the plurality accounts that approve termination of the anonymous mode is greater than or equal to a second reference value based on the second voting information; and terminating the anonymous mode, if the determining determines that the number of the plurality of accounts or the ratio of the plurality accounts is greater than or equal to a second reference value.

In some example embodiments, the terminating includes terminating the anonymous mode after a first reference time period elapses after receiving the request to terminate the anonymous mode.

In some example embodiments, the method further includes receiving one or more parameters from the one of the plurality accounts requesting termination of the anonymous mode, the one or more parameters including at least one of a duration time of the anonymous mode and whether to disclose which of the plurality of users generated the first message in the anonymous mode when the anonymous mode is terminated.

In some example embodiments, the determining includes incrementing the number of the plurality of accounts that approve the anonymous mode based on the plurality of accounts that do not provide the first voting information within a second reference time.

In some example embodiments, the determining includes incrementing a number of the number of the plurality of accounts that disapprove the anonymous mode based on the plurality of accounts that do not provide the first voting information within a second reference time.

In some example embodiments, the converting includes at least one of generating and receiving the plurality of temporary accounts and an indication of which of the plurality of temporary accounts correspond to the plurality of accounts.

In some example embodiments, the converting converts the plurality of accounts to the plurality of temporary accounts such that each of the plurality of temporary accounts is in a one-to-one correspondence with each of the plurality of outside accounts and the first account, and the displaying displays the first message in the chat room such that an indication of the temporary account associated with the account that transmitted the first message is displayed in the chat room.

In some example embodiments, the displaying displays the first message in the chat room such that the first message and subsequent messages created by other ones of the plurality of accounts are aligned in the same direction on each of user terminals associated with the plurality of accounts.

Some example embodiments relate to a non-transitory computer readable recording medium having recorded thereon a program, which when executed by a computer, performs the method of facilitating electronic communication of at least a first message between a plurality of accounts including a first account and a plurality of outside accounts.

Some example embodiments relate to an apparatus configured to facilitate electronic communication of at least a first message in between a plurality of accounts including a first account and a plurality of outside accounts within a chat room In some example embodiments, the apparatus includes an Input/Output (I/O) device configured to, receive a request to convert a mode of the chat room to an anonymous mode, and receive first voting information from the plurality of accounts, the first voting information indicating whether a user associated with a respective one of the plurality of accounts approves conversion of the chat room to the anonymous mode; and a controller configured to, determine if a number of the plurality of accounts or a ratio of the plurality accounts that approve the anonymous mode is greater than or equal to a first reference value based on the first voting information; convert the mode of the chat room to the anonymous mode by matching each of a plurality of temporary accounts with a respective one of the plurality of accounts, if the determining determines that the number of the plurality of accounts or the ratio of the plurality accounts is greater than or equal to the first reference value; and control a display to display the first message from an account in the chat room with an indication of the temporary account associated with the account, if the I/O device receives the first message from one of the plurality of accounts.

In some example embodiments, the I/O device is configured to receive the request to convert the chat room to the anonymous mode from the first account; and the display is configured to display the chat room containing at least the first message therein.

In some example embodiments, the apparatus is configured to receive request to convert the chat room to the anonymous mode from the first account.

In some example embodiments, the controller is configured to redistribute the plurality of temporary accounts, if a new account joins the chat room by, releasing a correspondence relationship between the accounts and the plurality of temporary accounts, increasing a number of the plurality of temporary accounts, and matching each of the new account and the plurality of accounts with respective ones of the plurality of temporary accounts.

In some example embodiments, the controller is configured to terminate the anonymous mode and convert the chat room to a general mode, if the I/O device receives a request to terminate the anonymous mode from one of the plurality of accounts such that in the general mode, when the apparatus receives a second message from a transmitting account of the plurality of accounts, the controller displays the second message along with an indication of the transmitting account in the chat room.

Some example embodiments relate to a method of communicating messages in an instant messaging environment.

In some example embodiments, the method includes anonymizing the instant messaging environment by, generating a number of unique temporary accounts, assigning each of a plurality of users within the instant messaging environment with one of the unique temporary accounts, and associating the messages from each of the plurality of users with respective ones of the unique temporary accounts; and displaying the messages in the instant messaging environment such that a source of each of the messages is indicated with the respective ones of the unique temporary accounts.

In some example embodiments, the anonymizing anonymizes the instant messaging environment in response to a request to switch the instant messaging environment to an anonymous mode from one of the plurality of users.

In some example embodiments, the method further includes tallying a first approval rate amongst the users to switch to the anonymous mode; determining if the first approval rate is above a threshold; anonymizing the instant messaging environment, if the first approval rate is greater than or equal to the threshold; and maintaining an identified mode in which the source of each of the messages is indicated as a respective one of the plurality of users, if the first approval rate is less than the threshold.

In some example embodiments, the method further includes re-anonymizing the instant messaging environment, if a new user joins the instant messaging environment operating in the anonymous mode, the re-anonymizing including, unassigning each of the plurality of users to one of the unique temporary accounts; increasing the number of the unique temporary accounts; and assigning each of the plurality of users and the new user within the instant messaging environment with one of the unique temporary accounts.

In some example embodiments, the method further includes tallying a second approval rate amongst the users to exit the anonymous mode and switch to an identified mode in which the source of each of the messages is indicated as a respective one of the plurality of users; determining if the second approval rate is above a threshold; switching the instant messaging environment to the identified mode, if the second approval rate is greater than or equal to the threshold;

and maintaining the anonymous mode, if the second approval rate is less than the threshold.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
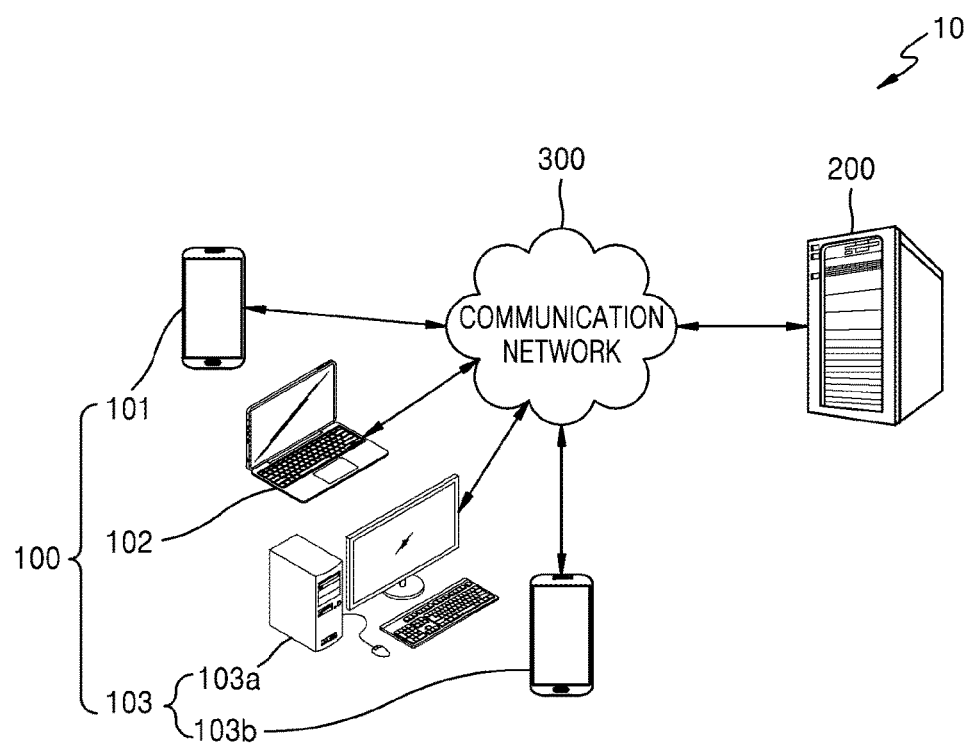
FIG. 1 schematically illustrates a structure of a chat service providing system according to an example embodiment.

Reference will now be made in detail to embodiments, examples of which are illustrated in the accompanying drawings, wherein like reference numerals refer to like elements throughout. In this state, the present example embodiments may have different forms and should not be construed as being limited to the descriptions set forth herein. Accordingly, the example embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the example embodiments allow for various changes and numerous embodiments, embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure. In the description of the disclosure, certain detailed explanations of the related art are omitted when it is deemed that they may unnecessarily obscure the essence of the example embodiments. While such terms as "first," "second," etc., may be used to describe various components, such components must not be limited to the above terms. The above terms are used only to distinguish one component from another. An expression used in the singular encompasses the expression of the plural, unless it has a clearly different meaning in the context. In the present example embodiments, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Sizes of components in the drawings may be exaggerated for convenience of explanation. In other words, since sizes and thicknesses of components in the drawings are arbitrarily illustrated for convenience of explanation, the following embodiments are not limited thereto.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion.

In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

FIG. 1 schematically illustrates a structure of a chat service providing system according to an example embodiment.

Referring to FIG. 1, chat service providing system 10 according to the present example embodiment may include a plurality of user terminals 100 and a chat service providing server 200 connected via a communication network 300.

The user terminals 100 may signify communication terminals capable of transmitting and receiving messages therebetween in a wired/wireless communication environment.

In example embodiments, a message may signify an object such as an alphabet, a picture, or a photo that may be visibly recognized or capable of conveying information in a visual and/or audio format to a counterpart, or a set of the objects. For example, a message may include a text, a picture, or a photo which may be displayed on a display unit 403 of each of the user terminals 100, a sentence or emoticon that may be created by combining the same and/or an audio clip reproduced using a speaker, but the present example embodiments are not limited thereto.

All or some of the user terminals 100 may join a chat room. In example embodiments, a chat room may represent a plurality of user terminals 100 organized into a group such that, from the point of view of the user terminals 100, a sort of a user interface (UI) is displayed on the display unit 403 of each of the user terminals 100 and may be an area where messages transmitted and received among the user terminals 100 are displayed.

Each of the user terminals 100 may signify electronic apparatuses, and each of the user terminals may be physically separate electronic apparatuses.

In some example embodiments, each of the user terminals 100 may be associated with a different user or, alternatively, one or more of the user terminals 100 may be separate electronic apparatuses associated with a same user.

For example, the user terminals 100 may include a first user terminal 101 and a second user terminal 102 that are each associated with a different user such that the first user terminal 101 and the second user terminal 102 may be treated as different user terminals 100.

Further, the third user terminal 103 may include multiple user terminals in which an account logged with each of the third user terminals 103 is the same such that the third user terminals 103 may be treated as a single user terminal. In other words, the third user terminal 103 may include a (3-a)th user terminal 103*a* and a (3-b)th user terminal 103*b*. In this state, when a first user account is logged with both of the (3-a)th user terminal 103*a* and the (3-b)th user terminal 103*b*, the (3-a)th user terminal 103*a* and the (3-b)th user terminal 103*b* may be treated as a single third user terminal 103.

In example embodiments an account may be a concept similar to a user identity (ID), and signify a qualification to join a chat room, which is generated for or given to a user of the first user terminal 101 to chat in the chat room with other external user terminal 100. In other words, the first user terminal 101 may be authorized to join the chat room based on the account associated therewith. As described above, when a single user uses two or more user terminals, all of the user terminals 100 of the user may use a single account.

In FIG. 1, electronic apparatuses such as smartphones, desktop computers, and notebook computers are illustrated as examples of the user terminals 100. However, example embodiments are not limited thereto, and an electronic apparatus capable of transmitting and receiving data with other electronic apparatus in a wired/wireless communication environment may be included in the user terminals 100 without a limit.

In detail, the user terminals 100 may include, for example, tablet PCs, smart TVs, mobile phones, personal digital assistants (PDAs), media players, micro-servers, global positioning system (GPS) apparatuses, electronic book terminals, digital broadcasting terminals, navigation apparatuses, kiosks, MP3 players, digital cameras, wearable apparatuses, and other mobile or non-mobile computing apparatuses, but the present disclosure is not limited thereto. Furthermore, the user terminals 100 may include various apparatuses capable of receiving touch inputs, such as electronic blackboards, touch tables. Also, the user terminals 100 may include accessories such as watches, glasses, hair bands, and rings, which are equipped with a communication function and a data processing function, but the present disclosure is not limited thereto.

The chat service providing server 200 may be a server used to provide a chat service. Although FIG. 1 illustrates only one server, a plurality of servers may be present by being connected to one another by a wired/wireless communication method according to the amount of connection or data.

The chat service providing server 200 may store messages transmitted or received between the user terminals 100. Also, the chat service providing server 200 may store information about the existence of a chat room created among all or some of the user terminals 100, the creation time of a chat room, terminals or accounts joining a chat room, and messages displayed in a chat room.

The chat service providing server 200 may provide materials received from any one of the user terminals 100 to all or some of the user terminals 100.

The chat service providing server 200 may provide general search services and various services to improve convenience of other users, in addition to the services of transmitting/receiving and storing visual materials. In other words, the chat service providing server 200 may provide, in addition to the material transmitting/receiving service, various services such as search, emails, blogs, social network services, news, and shopping information.

Alternatively, the chat service providing server 200 may be an apparatus included in a server providing a portal service such as search, emails, news, and shopping. A server providing a portal service may be a server that provides a webpage provided by the portal service to the user terminals 100 requesting information from the portal service. The chat service providing server 200 and a portal service providing server may be physically separate servers or logically divided servers in a single physical server.

In FIG. 1, the user terminals 100 are connected to one another to be capable of directly transmitting or receiving data among the user terminals 100 via the communication network 300, and actually, data may be transmitted or received in such a manner. However, in some example embodiments, the chat service providing system 10 may allow the data communication between the user terminals 100 to be performed only through the chat service providing server 200. In other words, for example, a message that the first user terminal 101 transmits in a form of an electrical signal may be transferred to the chat service providing server 200 via the communication network 300, and then, the message may be transferred from the chat service providing server 200 to the second user terminal 102 via the communication network 300.

The communication network 300 may connect the user terminals 100 and the chat service providing server 200. The communication network 300 may include, for example, wired networks such as local area networks (LANs), wide area networks (WANs), metropolitan area networks (MANs), and integrated service digital networks (ISDNs), or wireless networks such as wireless LANs, CDMA, Bluetooth, satellite communications, but example embodiments are not limited thereto.

Figure 2:
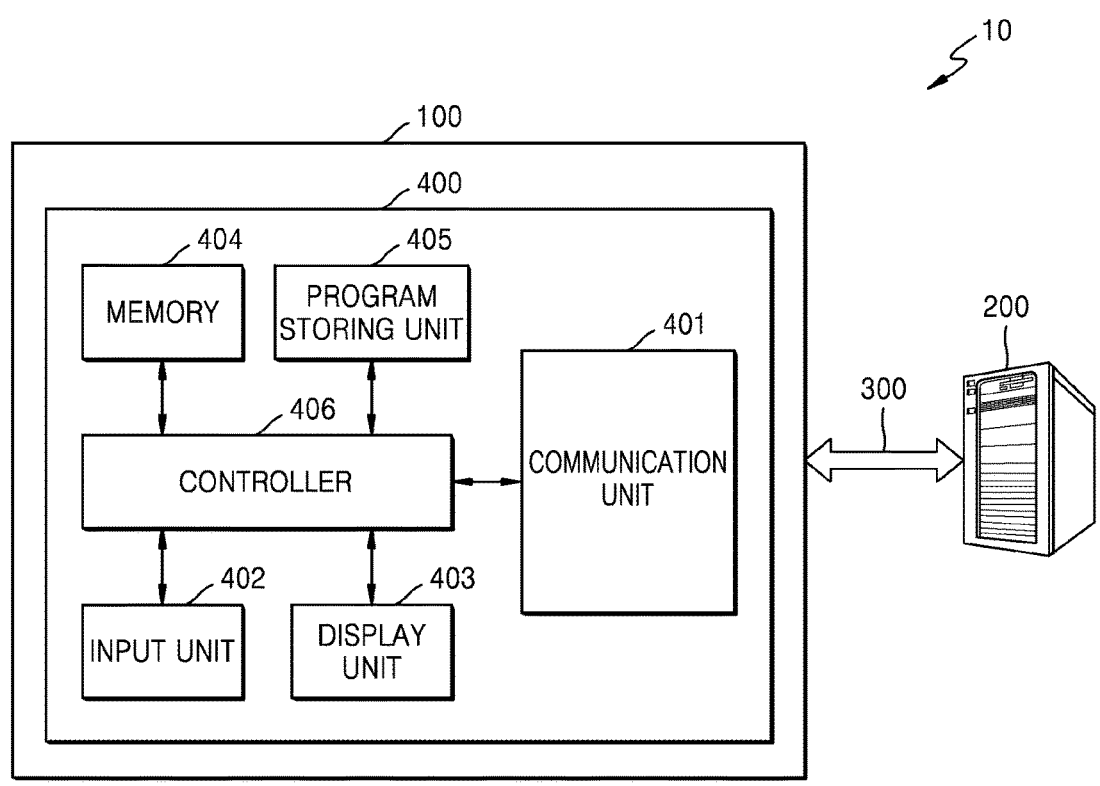
FIGS. 2 and 3 are block diagrams schematically illustrating examples of an internal structure of a chat service providing system according to example embodiments.
Figure 3:
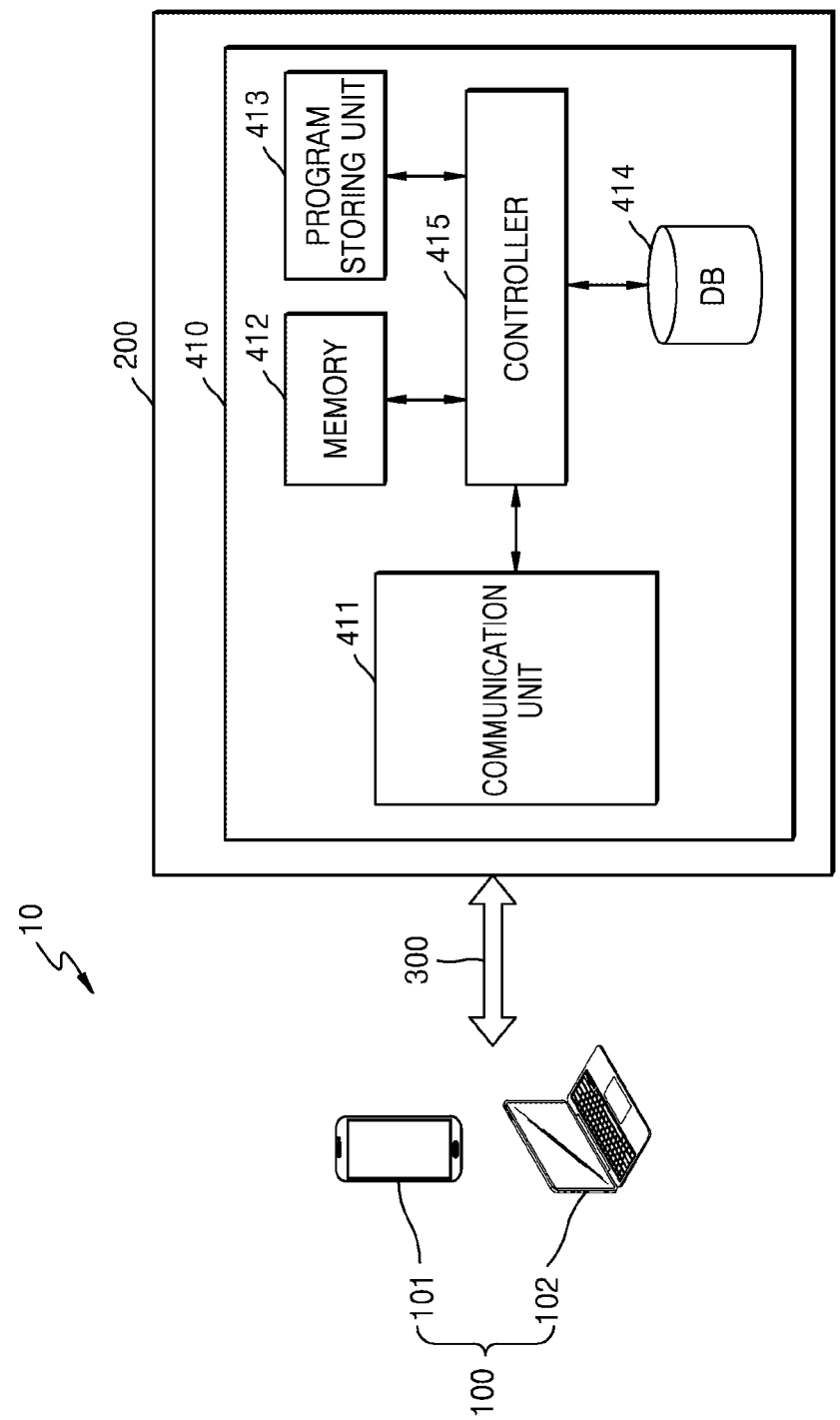

FIGS. 2 and 3 are block diagrams schematically illustrating examples of an internal structure of the chat service providing system according to example embodiments.

Referring to FIG. 2, in some example embodiments, the chat service providing system 10 may include the user terminal 100 and the chat service providing server 200.

The user terminal 100 may include a chat service providing apparatus 400. In this case, the chat service providing apparatus 400 may include a communication unit 401, an input unit 402, the display unit 403, a memory 404, a program storing unit 405, and a controller 406.

The chat service providing apparatus 400 may be an apparatus included in the user terminal 100. In other words, the chat service providing apparatus 400 may be hardware provided inside or outside the user terminal 100 or hardware equipped with software performing a chat service function. Alternatively, the user terminal 100 may include software such as an application having a search service function installed thereon, that, when executed by a processor, configures the user terminal 100 as the chat service providing apparatus 400.

The communication unit 401 and/or the Input unit 402 may be referred to as an Input/Output (I/O) device, and may perform wired/wireless communication with the external other user terminals 100 or the chat service providing server 200 via the communication network 300. The communication unit 401 may transmit or receive data including a message with the other user terminals 100 or the chat service providing server 200 via the communication network 300. The communication unit 401 may be a Bluetooth communication unit, a Bluetooth low energy (BLE) communication unit, a near field communication unit, a wireless local area network (WLAN) communication unit, a Zigbee communication unit, an infrared data association (IrDA) communication unit, a Wi-Fi direct (WFD) communication unit, an ultra wideband (UWB) communication unit, or an Ant+ communication unit, but the present disclosure is not limited thereto.

The communication unit 401 may be included in a constituent element of the user terminal 100 performing wired/wireless communication with an external electronic apparatus, or the constituent element of the user terminal 100 may be the communication unit 401 of the chat service providing apparatus 400.

The input unit 402 may receive a user input for a chat service through a message. For example, the input unit 402 may receive a user's voice input, a user's text input, or a user's touch input, but the present disclosure is not limited thereto. The input unit 402 may form a layer structure with the display unit 403, thereby forming a single touch screen. In this case, the display unit 403 and the input unit 402 may form a single physical form.

The input unit 402 may be included in a constituent element for receiving a user input in the user terminal 100, or the constituent element of the user terminal 100 may be the input unit 402 of the chat service providing apparatus 400.

The display unit 403 may display information processed by the chat service providing apparatus 400. The display unit 403 may display visual materials transmitted and received between the chat service providing apparatus 400 and the other external user terminals 100. For example, the display unit 403 may display a chat room including message contents among a user of the chat service providing apparatus 400 and users of the other external user terminals 100, and the transmitted or received messages may be displayed in a corresponding chat room. Information about the existence of a chat room may be stored in each of the user terminals 100 joining the corresponding chat room, or in the chat service providing server 200. In this state, the display unit 403 may directly display the transmitted/received visual material or display an interface showing the fact that the corresponding visual material is received. For example, when the received visual material is a text message or picture, the display unit 403 may directly display a corresponding text message or picture. In another example, when the received visual material is an electronic document that may not be directly executed on the chat service providing apparatus 400, the display unit 403 may display a particular interface showing the corresponding electronic document.

The display unit 403 may include at least one of a liquid crystal display, a thin film transistor-liquid crystal display, an organic light-emitting diode, a flexible display, a 3D display, and an electrophoretic display, but the present disclosure is not limited thereto. The chat service providing apparatus 400 may include two or more display units according to the implement type of the chat service providing apparatus 400.

The display unit 403 may be included in a constituent element displaying information processed in the user terminal 100, or the constituent element of the user terminal 100 may be the display unit 403 of the chat service providing apparatus 400.

The memory 404 may be a non-volatile memory, a volatile memory, a hard disk, an optical disk, and a combination of two or more of the above-mentioned devices. The memory may be a non-transitory computer readable medium. The non-transitory computer-readable media may also be a distributed network, so that the program instructions are stored and executed in a distributed fashion. The non-volatile memory may be a Read Only Memory (ROM), a Programmable Read Only Memory (PROM), an Erasable Programmable Read Only Memory (EPROM), or a flash memory. The volatile memory may be a Random Access Memory (RAM). The memory 404 may temporarily or permanently store data processed by the controller 406. The memory 404 may include a magnetic storage media or a flash storage media, but the present disclosure is not limited thereto. The memory 404 may store the messages transmitted to or received from the other user terminals 100 or the chat service providing server 200.

The memory 404 may be included in a constituent element performing a function of temporarily or permanently storing data processed in the user terminal 100, or the constituent element of the user terminal 100 may be the memory 404 of the chat service providing apparatus 400.

The program storing unit 405 may be a constituent element including software performing various jobs that are essential or auxiliary in a process of providing a chat service.

The program storing unit 405 may be included in a constituent element of the user terminal 100 to include software performing various jobs that are essential or auxiliary to driving of the user terminal 100, or the constituent element of the user terminal 100 may be the program storing unit 405 of the chat service providing apparatus 400.

The controller 406 may typically control an overall operation of the chat service providing apparatus 400. For example, the controller 406 executes software stored in the program storing unit 405 included in the chat service providing apparatus 400 so as to generally control other constituent elements included in the communication unit 401, the input unit 402, the display unit 403, the memory 404, and the chat service providing apparatus 400.

The controller 406 may include all types of data processing devices such as a processor.

The "processor" may denote, for example, data processing device included in hardware and having a physically configured circuit to perform a function expressed by codes or commands included in a program. As such, the data processing device included in hardware may include a processing device such as an arithmetic logic unit, a digital signal processor, a microcomputer, a microprocessor, a central processing unit (CPU), a processor core, a multiprocessor, an application specific integrated circuit (ASIC), a field programmable gate array (FPGA) or any other device capable of responding to and executing instructions in a defined manner, but the present disclosure is not limited thereto.

The processor may be programmed with instructions that configure the processor into a special purpose computer to perform the operations illustrated in FIG. 4, discussed below, such that the processor may create a chat room in which chatting is performed using messages transmitted or received between accounts.

The controller 406 may be included in a constituent element of the user terminal 100 controlling an overall operation of the user terminal 100, or the constituent element of the user terminal 100 may be the controller 406 of the chat service providing apparatus 400.

In the following description, for convenience of explanation, the user terminal 100, which includes the chat service providing apparatus 400 and is the subject of the following explanation, is expressed as one joining a chat room using a first account, whereas all accounts other than the first account joining the chat room are expressed as being outside accounts.

The controller 406 may create a chat room in which chatting is performed using messages transmitted or received between the first account and other outside accounts. In detail, when the input unit 402 receives a request to create a chat room, from the first account, or the communication unit 401 receives a request to create a chat room from the outside accounts, the controller 406 may create a chat room according to options that the request instructs. The option in the creation of a chat room may include the name of a chat room or users to join the chat room.

After the chat room is created, the input unit 402 may receive, from the first account, a request to convert a mode of the chat room to an anonymous mode. Also, the communication unit 401 may receive a request to convert a mode of the chat room to an anonymous mode from any one of the outside accounts joining the chat room. In other words, all accounts joining the chat room may request to convert a mode of a particular chat room to an anonymous mode.

When a request to convert a mode to an anonymous mode is input, the input unit 402 may receive an opinion of approval or disapproval with respect to the conversion of a mode to an anonymous mode from the first account. Also, the communication unit 401 may receive opinions of approval or disapproval with respect to the conversion of a mode to an anonymous mode from all or some of the outside accounts joining the chat room. In this state, the controller 406 may consider the account that requested the conversion of a mode to an anonymous mode, to be one approving the request.

Then, the controller 406 may check whether the number or ratio of approval opinions is over a first reference value among the input and received opinions of approval or disapproval. The first reference value may be a value equivalent to unanimity. In other words, the first reference value may be the same number as the number of all members joining the chat room or a ratio of 100%, however, example embodiments are not limited thereto. For example, the first reference value may signify a majority of the members of the chat room, and/or may give more weight to the first user when determining if the first reference value has been met. In addition, the chat service providing apparatus 400 may determine the first reference value, or the account requested the conversion of a mode to an anonymous mode may directly determine the first reference value.

If the number or ratio of approval opinions is over the first reference value, the controller 406 may convert a mode of the chat room to an anonymous mode. To this end, the controller 406 may make each of the accounts joining the chat room in a one-to-one correspondence with each of temporary accounts. The temporary accounts may be generated by the controller 406 to be the same number as the number of accounts joining the chat room, or may be information about the temporary accounts of the same number as the number of accounts joining the chat room, which the communication unit 401 receives from the chat service providing server 200. Also, the one-to-one correspondence relationship between the respective accounts joining a chat room and the temporary accounts may be generated by the controller 406, or may be information about the one-to-one correspondence relationship, which the communication unit 401 receives from the chat service providing server 200.

When messages are transmitted or received between the accounts joining a chat room in the anonymous mode, the controller 406 may display in the chat room a first message received from any one of the outside accounts and the first account, with an indication that the temporary account in a one-to-one correspondence with the account that transmitted the first message has transmitted the first message. A detailed description on the anonymous mode of a chat room is presented below with reference to FIGS. 5 to 8.

As described above, in some example embodiments, the chat service providing apparatus 400 may be an apparatus included in the user terminals 100 such that the user terminals 100 manage the chat room using peer-to-peer communication without the chat service providing server 200.

Referring to FIG. 3, in other example embodiments, the chat service providing server 200 may also include a chat service providing apparatus 410 that assists the user terminals 100 with managing the chat room.

The chat service providing apparatus 410 may include a communication unit 411, a memory 412, a program storing unit 413, a database 414, and a controller 415.

Among constituent elements of the chat service providing apparatus 410 of FIG. 3, descriptions on the constituent elements performing the same function as those of the constituent elements included in the chat service providing apparatus 400 of FIG. 2 are omitted and the constituent elements having differences are mainly discussed below.

The chat service providing apparatus 410 may be an apparatus included in the chat service providing server 200. In other words, the chat service providing apparatus 410 may be hardware provided inside or outside the chat service providing server 200, or hardware equipped with software performing a chat service function. Alternatively, the chat service providing server 200 may be the chat service providing apparatus 410.

The communication unit 411 may perform wired/wireless communications with the user terminals 100 via the communication network 300. The communication unit 411 may receive messages from the user terminals 100 and transmit the messages to the user terminals 100, via the communication network 300. In this state, the communication unit 411 may be included in a constituent element of the chat service providing server 200, performing wired/wireless communications with an external electronic apparatus, or the constituent element of the chat service providing server 200 may be the communication unit 411 of the chat service providing apparatus 410.

The memory 412 may perform a function of temporarily or permanently storing data processed by the controller 415. The memory 412 may be included in a constituent element performing a function of temporarily or permanently storing data processed in the chat service providing server 200, or the constituent element of the chat service providing server 200 may be the memory 412 of the chat service providing apparatus 410.

The program storing unit 413 may be a constituent element including software performing various jobs that are essential or auxiliary in a process of providing a chat service. The program storing unit 413 may be included in a constituent element of the chat service providing server 200 to include software performing various jobs that are essential or auxiliary to driving of the chat service providing server 200, or the constituent element of the chat service providing server 200 may be the program storing unit 413 of the chat service providing apparatus 410.

A database (DB) 414 may store information about messages transmitted to or received from the chat service providing apparatus 410 or the chat service providing server 200, the existence of created chat rooms, creation time of chat rooms, or user terminals or accounts joining chat rooms, or information displayed in a chat room. The DB 414 may be included in a constituent element of the chat service providing server 200, performing functions of storing and managing various types of data, or the constituent element of the chat service providing server 200 may be the DB 414 of the chat service providing apparatus 410.

The controller 415 may typically control an overall operation of the chat service providing apparatus 410. For example, the controller 406 may generally control the communication unit 411, the memory 412, the DB 414, and other constituent parts included in the chat service providing apparatus 410 by executing software stored in the program storing unit 413 included in the chat service providing apparatus 410. The controller 415 may be included in a constituent element of the chat service providing server 200 performing a function of controlling an overall operation of the chat service providing server 200, or the constituent element of the chat service providing server 200 may be the controller 415 of the chat service providing apparatus 410.

The controller 415 may include a data processing device such as a processor.

The "processor" may denote, for example, data processing device included in hardware and having a physically configured circuit to perform a function expressed by codes or commands included in a program. As such, the data processing device included in hardware may include a processing device such as an arithmetic logic unit, a digital signal processor, a microcomputer, a microprocessor, a central processing unit (CPU), a processor core, a multiprocessor, an application specific integrated circuit (ASIC), a field programmable gate array (FPGA) or any other device capable of responding to and executing instructions in a defined manner, but the present disclosure is not limited thereto.

The processor may be programmed with instructions that configure the processor into a special purpose computer to perform the operations illustrated in FIG. 4, discussed below, such that the processor may create a chat room in which chatting is performed using messages transmitted or received between accounts.

The controller 415 may create a chat room in which chatting is performed using messages that are transmitted or received between a plurality of accounts.

After the chat room is created, the communication unit 411 may receive a request to convert a mode of the chat room to an anonymous mode from any one of accounts joining the chat room.

When a request to convert a mode to an anonymous mode is input, the communication unit 411 may receive opinions of approval or disapproval with respect to the conversion of a mode to an anonymous mode from all or some of the outside accounts joining the chat room. In this state, the controller 415 may consider the account that requested the conversion of a mode to an anonymous mode, to be one approving the request.

Then, the controller 415 may check whether the number or ratio of approval opinions is over a first reference value among the input and received opinions of approval or disapproval. If the number or ratio of approval opinions is over the first reference value, the controller 415 may convert a mode of the chat room to an anonymous mode. To this end, the controller 415 may generate the same number of temporary accounts as the number of the accounts joining the chat room, and make each of the generated temporary accounts in a one-to-one correspondence with each of the accounts joining the chat room. The anonymous mode of a chat room is described below with reference to FIGS. 5 to 8.

Figure 4:
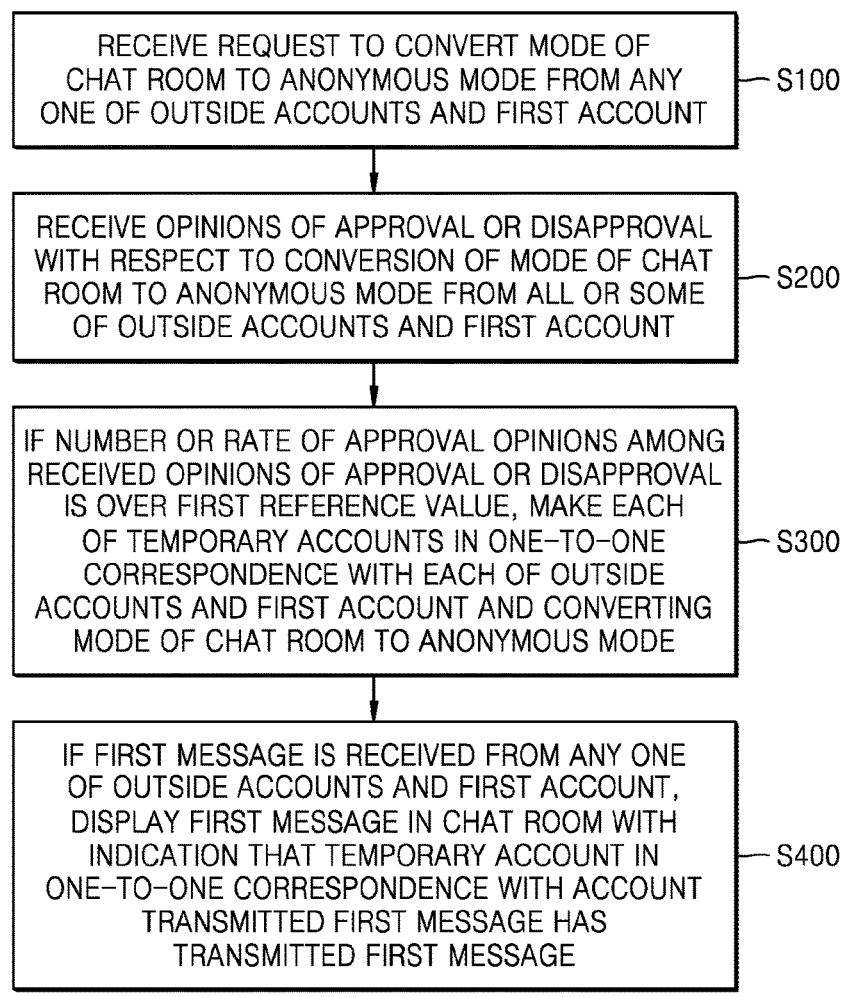
FIG. 4 is a flowchart of a method of providing a chat service according to an example embodiment.

FIG. 4 is a flowchart of a method of providing a chat service according to an embodiment.

The flowchart of FIG. 4 includes operates that are time-serially processed in the chat service providing apparatus 400 of FIG. 2 and/or the chat service providing apparatus 410 of FIG. 3. Accordingly, although omitted herein, the descriptions presented above regarding the structures illustrated in FIG. 2 or 3 may be applied to the flowchart of FIG. 4.

Referring to FIG. 4, in a search service providing method according to the example embodiments, the chat service providing apparatus 400, 410 may receive a request to convert a mode of a chat room to an anonymous mode from any one of a plurality of outside accounts and a first account (S100).

In operation S200, the chat service providing apparatus 400, 410 may receive opinions of approval or disapproval with respect to the conversion of a mode of a chat room to an anonymous mode from all or some of the outside accounts and the first account.

In operation S300, the chat service providing apparatus 400, 410 may set each of a plurality of temporary accounts in a one-to-one correspondence with each of the outside accounts and the first account and convert the mode of a chat room to an anonymous mode, if the number or ratio of approval opinions among the received opinions of approval or disapproval is over a first reference value.

In operation S400, the chat service providing apparatus 400, 410 may generate a first message in the chat room with an indication that a temporary account in a one-to-one correspondence with the account transmitted the first message and display the first message, if a first message is received from any one of the outside accounts and the first account.

FIGS. 5A to 8D schematically illustrate examples of providing a chat service in a chat service providing apparatus according to various example embodiments.

Figure 5A:
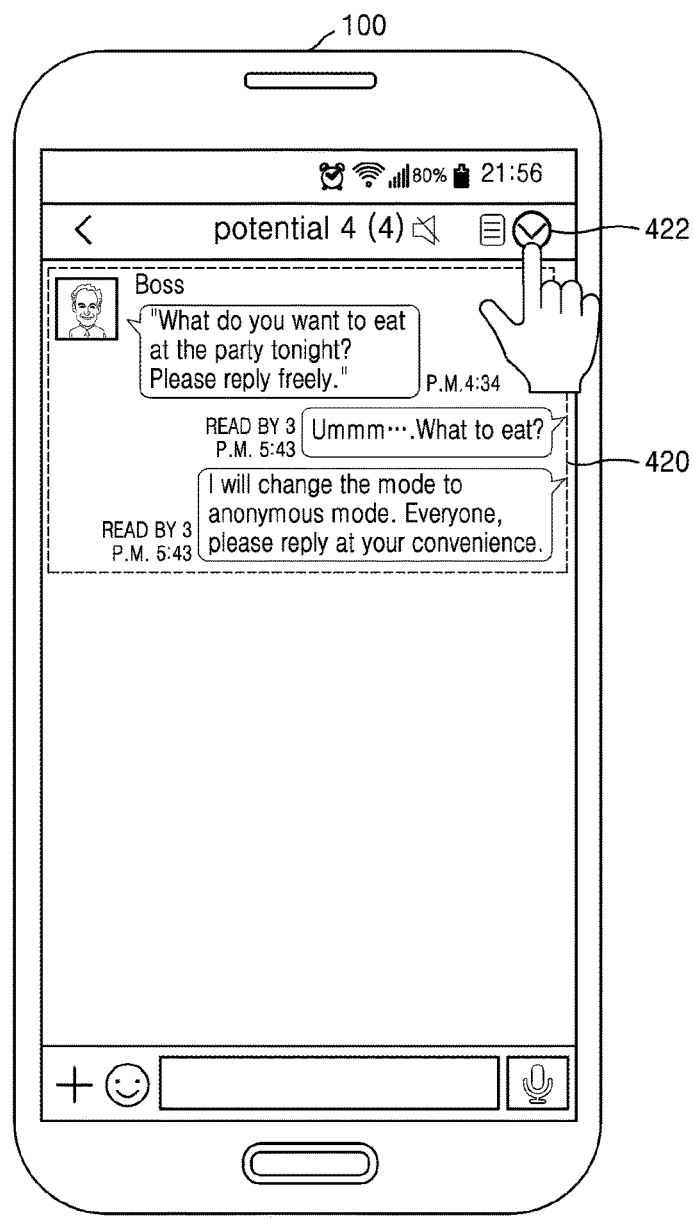
FIGS. 5A to 5D schematically illustrate examples of providing a chat service in a chat service providing apparatus according to various example embodiments.
Figure 5B:
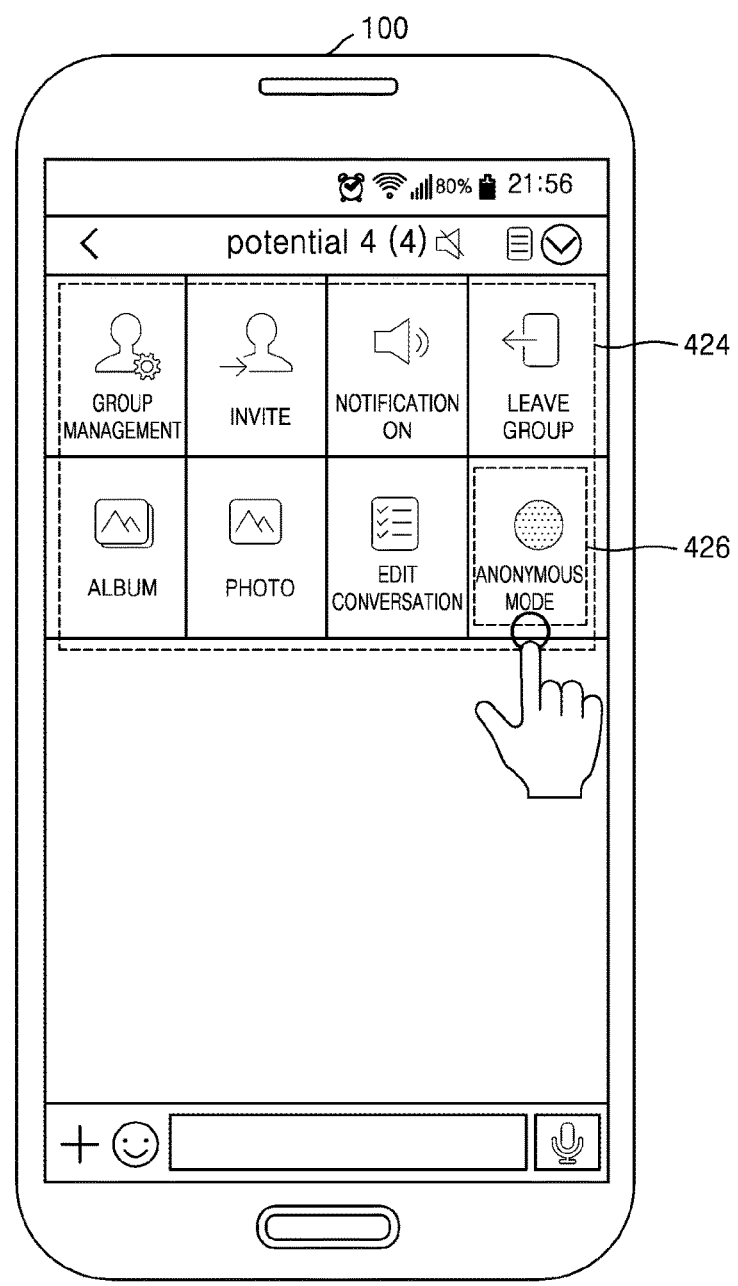

Referring to FIGS. 5A and 5B, the chat service providing system 10 may generate a chat room that is displayed on the user terminal 100.

For example, in some example embodiments, the chat providing apparatuses 400 in each of the user terminals 100 of FIG. 2 may form a peer-to-peer network and facilitate the chat service without the use of the chat service providing server 200. In other example embodiments, the chat providing apparatus 410 included in the chat service providing server 200 may provide a platform to perform one or more of operations S100 to S400 to assist in facilitating the chat service.

When a chat room operates in a general mode, the chat service providing server 200 may instruct the user terminal 100 to display a message on the user terminal 100 indicating that an account has joined the chat room and information about the account.

For example, an account having a name of "Boss" may transmit, from an associated user terminal 100, a message to the chat service providing server 200 indicating "What do you want to eat at the party tonight? Please reply freely."

During a chat 420 in a general mode, the chat service providing server 200 may distribute the message to each of the user terminals 100, and each of the chat service providing apparatuses 400 may display the message using a speech balloon that the message has been transmitted from an account having the name of "Boss".

In operation S100, as illustrated in FIG. 5B, the chat service providing apparatus 400 may receive an input to convert a mode of a chat room to an anonymous mode. In detail, the user terminal 100 may detect an input to convert a mode of a chat room to an anonymous mode. For example, the user terminal 100 may detect an input to select a menu user interface (UI) 422 from the display unit 403 of the user terminal 100. Accordingly, a chat room option menu 424 may be displayed on the user terminal 100. Then, the user terminal 100 may detect an input to select a UI 426 for converting a mode of a chat room to an anonymous mode.

The chat service providing apparatus 400 may transmit the request to the chat service providing server 200 via the communication network 300.

Thereafter, although not illustrated, the chat service providing apparatus 400 may request the initiating user who requested the anonymous mode input various parameters associated with the anonymous mode.

For example, the chat service providing apparatus 400 may query the user to input at least one of a duration time of an anonymous mode, whether to display the respective temporary accounts to be distinguished from one another, and whether to disclose one who wrote a message in the anonymous mode when the anonymous mode is terminated. In other words, when a mode of a chat room is converted to an anonymous mode, the chat service providing apparatus 400 has one who suggested the anonymous mode determine an option about how long the anonymous mode is maintained, or whether to maintain anonymity of a chat performed in the anonymous mode after the anonymous mode is terminated, so that the anonymous mode may be used in various purposes.

Figure 5C:
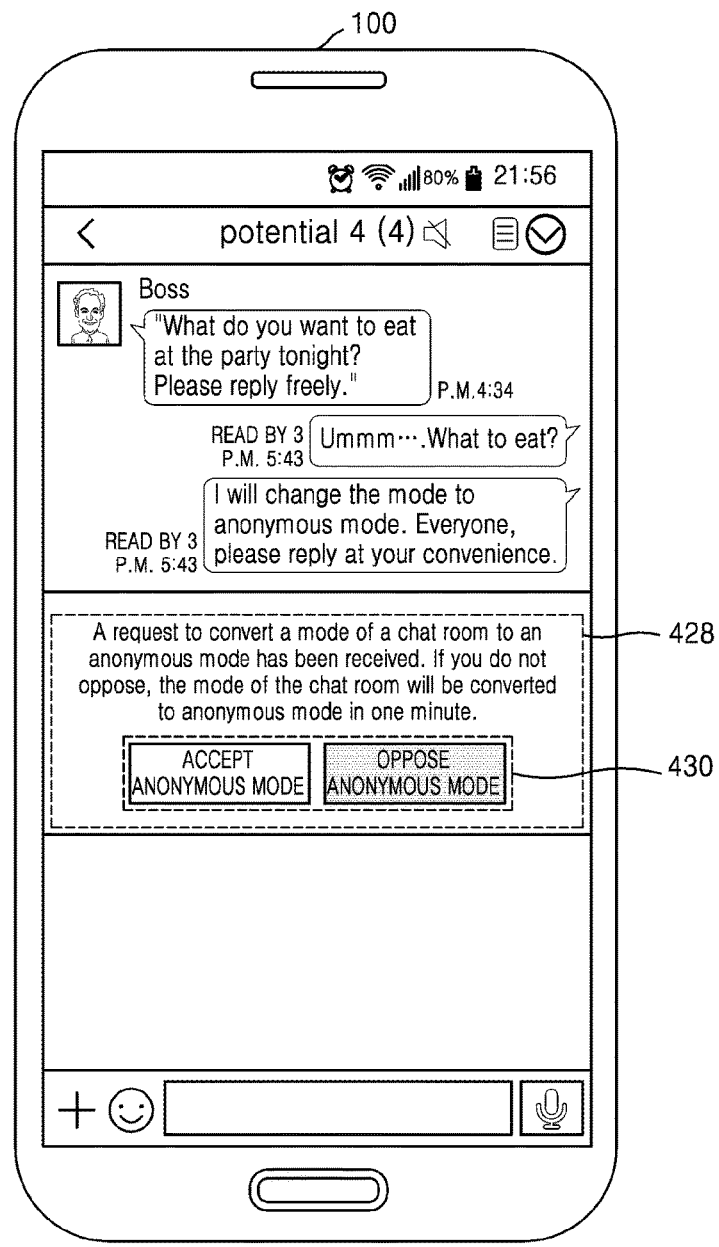

In operation S200, as illustrated in FIG. 5C, after the initiating user has requested conversion to the anonymous mode and, optionally, input the parameters associated therewith, the chat service providing server 200 may instruct each of the chat service providing apparatuses 400 to display a UI for receiving opinions of approval or disapproval with respect to the conversion of a mode of a chat room to an anonymous mode, on respective ones of the user terminals 100.

For example, the chat service providing apparatus 400 may display an indication that a request to convert a mode of a chat room to an anonymous mode has occurred, on the user terminals 100 through a UI 428 indicating that a request to convert a mode of a chat room to an anonymous mode is received. Also, the chat service providing apparatus 400 may display a UI 430 for receiving opinions of approval or disapproval such as "ACCEPT ANONYMOUS MODE" and "OPPOSE ANONYMOUS MODE" in the UI 428 indicating that the conversion of a mode of a chat room to an anonymous mode is requested.

The chat service providing apparatus 400 may wait for a predetermined (or, alternatively, a desired) period of time for each of the accounts to provide opinions of approval or disapproval. For example, the chat service providing apparatus 400 may display a message of "IF YOU DO NOT OPPOSE, ANONYMOUS MODE WILL BE ACTIVATED IN ONE MINUTE" in the UI 428 indicating that the conversion of a mode of a chat room to an anonymous mode is requested.

In some example embodiments, when no input of "ACCEPT ANONYMOUS MODE" or "OPPOSE ANONYMOUS MODE" is detected by the user terminal 100 within the period of time, the chat service providing apparatus 400 may consider the account of the user terminal 100 to have provided an approval opinion. In this regard, the chat service providing apparatus 400 may convert a mode of a chat room to an anonymous mode even when there is a participant in the chat room who does not check the chat room.

In other example embodiments, the chat service providing apparatus 400 may prevent the conversion of a mode of a chat room to an anonymous mode while there is a participant who does not check the chat room.

After receiving a selection from the users, the chat service providing apparatus 400 may omit displaying the opinions of approval or disapproval received from each of the user terminals 100 on other ones of the user terminals. Accordingly, the chat service providing apparatus 400 may prevent disclosure of the opinion of the user terminal 100 regarding the conversion of a mode of a chat room to an anonymous mode. In other example embodiments, the chat service providing apparatus 400 may temporarily display the opinion of approval or disapproval for a certain time passes from displaying of the opinion.

Figure 5D:
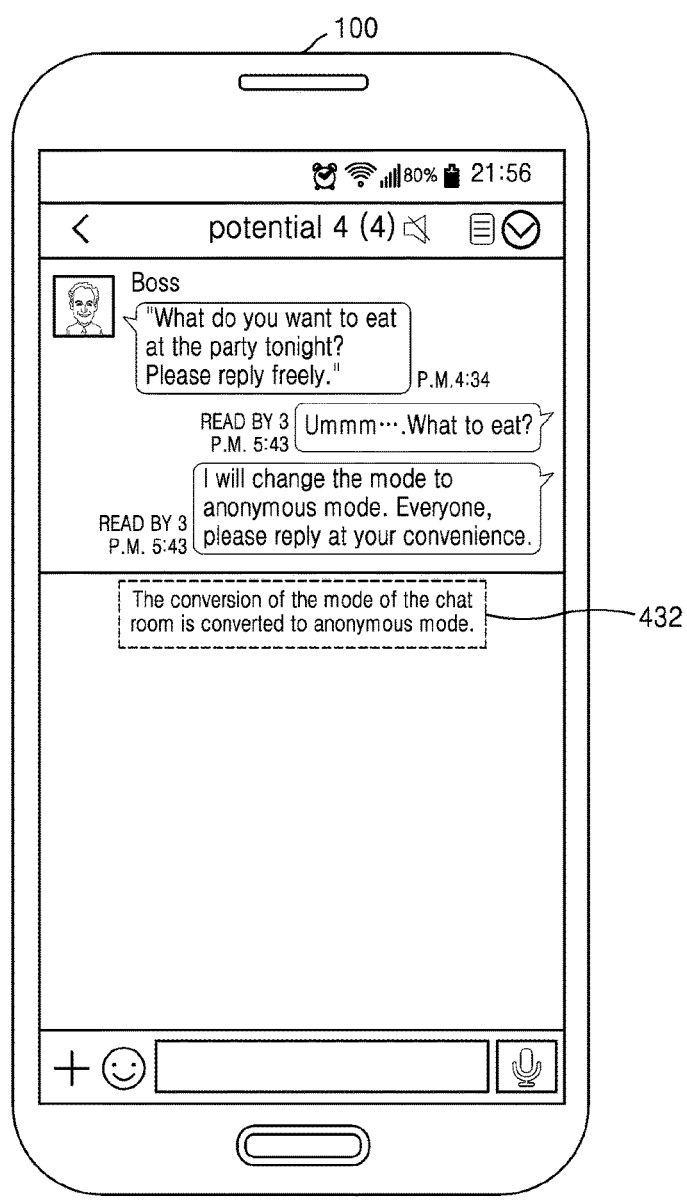

In operation S300, as illustrated in FIG. 5D, when the number of approval opinions with respect to the conversion of a mode of a chat room to an anonymous mode is over the first reference value, the chat service providing apparatus 400 may convert the mode of a chat room to an anonymous mode. In this case, the chat service providing apparatus 400 may display a message 432 indicating the conversion of a mode of a chat room is converted to an anonymous mode, on the user terminal 100.

Alternatively, when the number of approval opinions with respect to the conversion of a mode of a chat room to an anonymous mode is less than the first reference value, the chat service providing apparatus 400 may maintain the mode of a chat room in the general mode.

Referring to FIG. 6, the chat service providing apparatus 400 may change a mode of a chat room UI to an anonymous mode so that no one can see which account is used by one who transmits a particular message during chat in a chat room in the anonymous mode.

The chat service providing apparatus 400 may generate the same number of temporary accounts as the number of accounts joining a chat room, and make each of the temporary accounts in a one-to-one correspondence with each of the accounts joining the chat room.

Figure 6A:
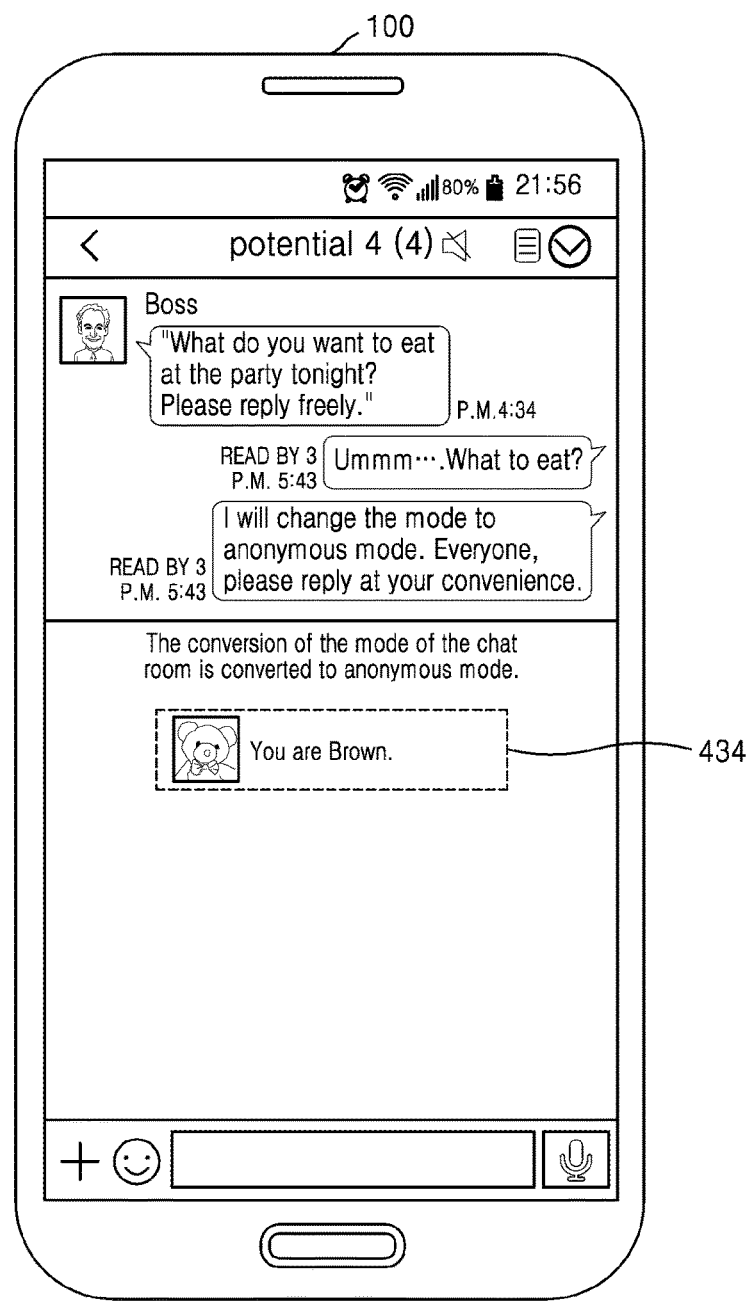
FIGS. 6A to 6B schematically illustrate examples of providing a chat service in a chat service providing apparatus according to various example embodiments.

As illustrated in FIG. 6A, when the chat room is converted to an anonymous mode, the chat service providing apparatus 400 may provide each of the accounts joining the chat room with information about which account is in a one-to-one correspondence with which temporary account. For example, the chat service providing apparatus 400 may display on the user terminal 100 a temporary account information message 434, that is, "You are Brown". In this state, the chat service providing apparatus 400 may display the temporary account information message 434, on the user terminal 100 for a certain period. After the certain period passes, the chat service providing apparatus 400 may delete the temporary account information message 434 from the user terminal 100. Accordingly, the chat service providing apparatus 400 may make it difficult for an observer of the chat to determine which account corresponds to which temporary account through the display unit 403 of the user terminal 100 after the certain period passes.

Figure 6B:
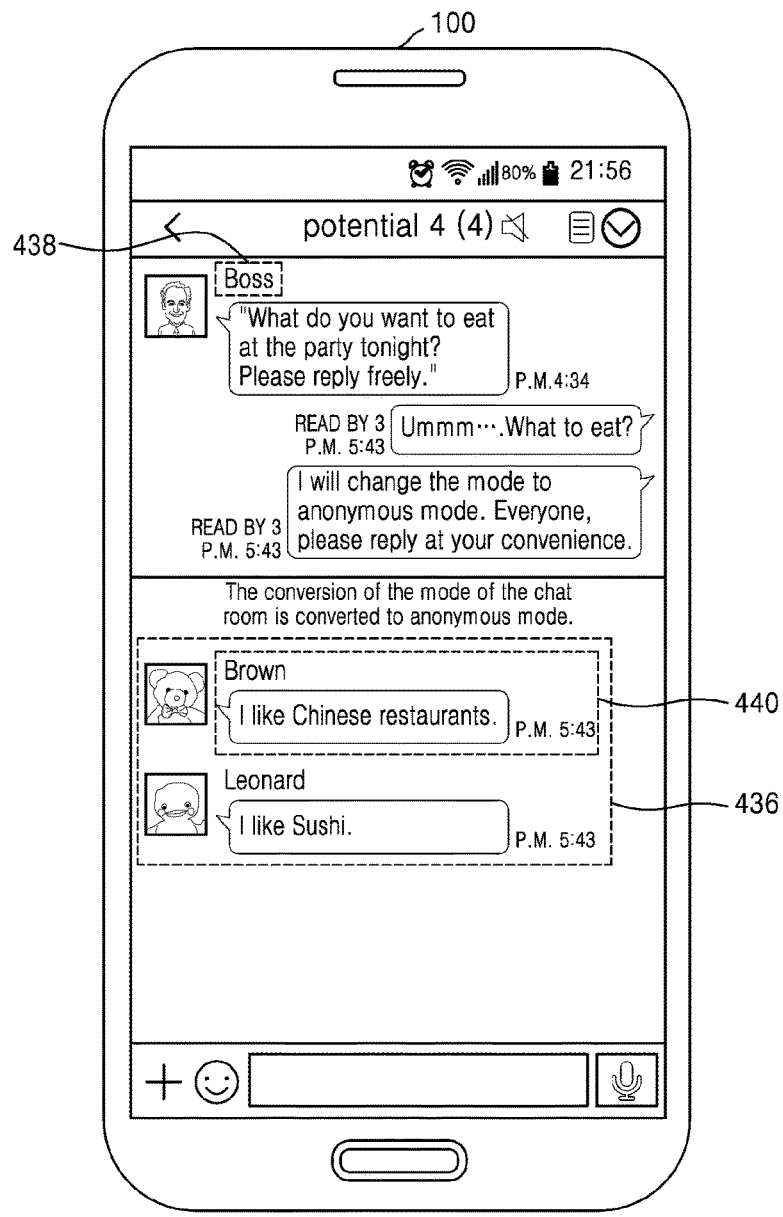

Subsequently, as illustrated in FIG. 6B, the chat service providing apparatus 400 may display the messages transmitted or received between the accounts as a chat between the temporary accounts. For example, when a certain account transmits a message 440 "I like Chinese restaurants" during chatting 436 in an anonymous mode, the chat service providing apparatus 400 may indicate the message as being transmitted by "Brown". In this case, each account may check only information about which temporary account corresponds to one's own account, and may not see whether a temporary account "Leonard" corresponds to an account "Boss" 438 or any other account joining the chat room. Accordingly, the chat service providing apparatus 400 may enable any account joining a chat room to express one's opinion without letting others know who one is.

In this state, the chat service providing apparatus 400 may display all messages indicated in a chat room to be aligned in the same direction to one side of the user terminal 100 displaying the chat room. For example, when the first account corresponds to the temporary account "Brown", the message 440 that is directly input by the first account may be arranged at the same position as the positions of messages input by other outside accounts. Accordingly, even when other person directly checks the user terminal 100 of the first account, the other person may not see that the first account corresponds to the temporary account "Brown".

Figure 7A:
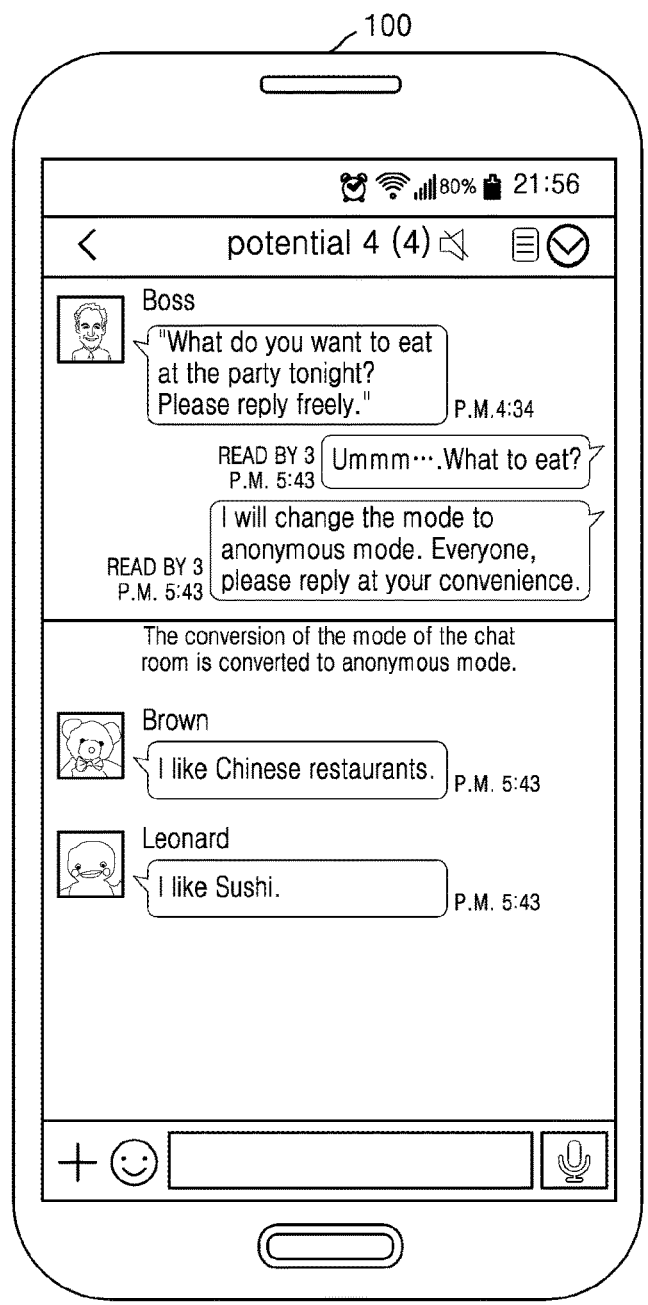
FIGS. 7A to 7B schematically illustrate examples of providing a chat service in a chat service providing apparatus according to various example embodiments.

Referring to FIG. 7, when a new account joins a chat room in an anonymous mode, the chat service providing apparatus 400 may make the new account in a one-to-one correspondence with a temporary account.

Figure 7B:
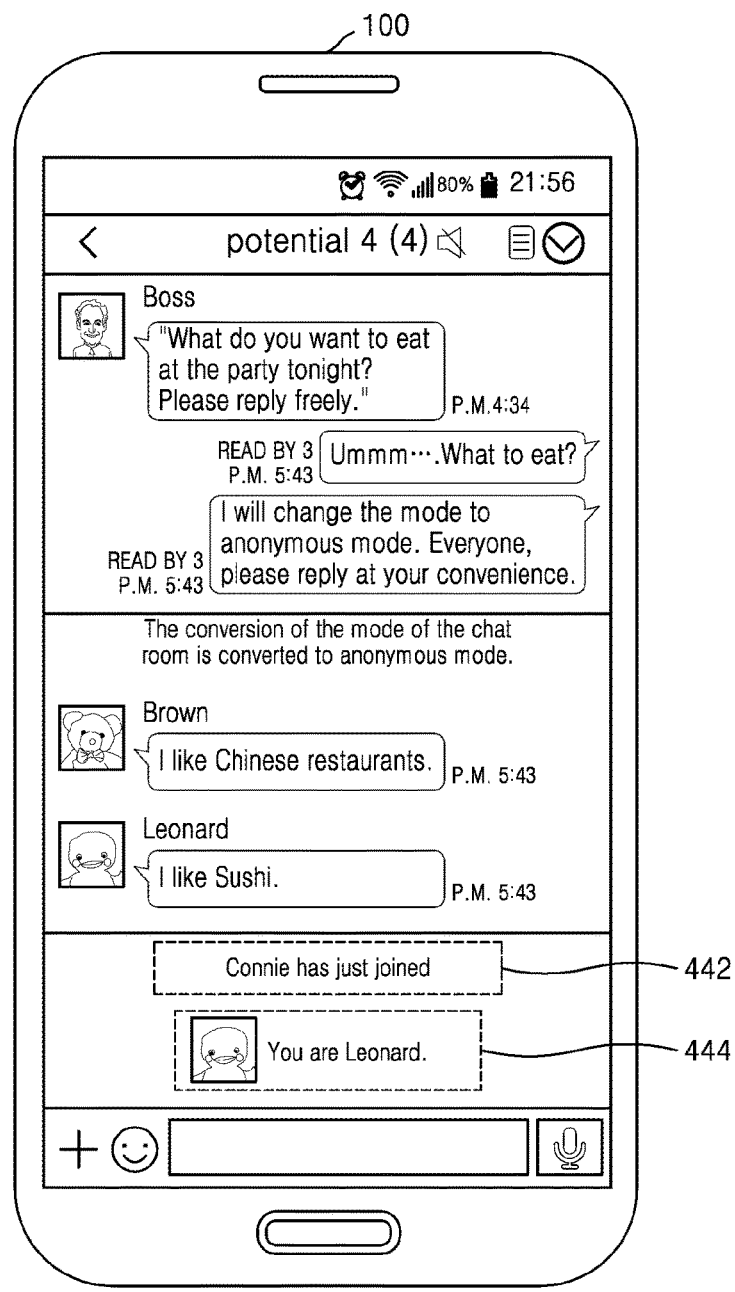

As illustrated in FIG. 7B, when a new account joins a chat room, the chat service providing apparatus 400 may increase the number of temporary accounts by one. Accordingly, the chat service providing apparatus 400 may make the number of the accounts joining the chat room and the number of temporary accounts to be the same.

The chat service providing apparatus 400 may make the new account in a one-to-one correspondence with any one of the temporary accounts. For example, the chat service providing apparatus 400 may make the new account in a one-to-one correspondence with a temporary account in the name of "Connie", and display in the chat room a chat member addition message 442 of "Connie has just joined".

In this state, the chat service providing apparatus 400 may remove the one-to-one correspondence relationship between each of the temporary accounts and the accounts joining the chat room before the new account joins the chat room. Then, the chat service providing apparatus 400 may newly set a one-to-one correspondence relationship between each of the temporary accounts and the accounts joining the chat room including the new account. For example, when the new account joins the chat room, the chat service providing apparatus 400 may make the first account in a one-to-one correspondence with the temporary account in the name of "Leonard", and display a temporary account information message 444 of "You are Leonard" on the user terminal 100. Accordingly, the chat service providing apparatus 400 may prevent the account newly joining the chat room being distinguished from the accounts previously joining the chat room.

Referring to FIG. 8, the chat service providing apparatus 400 may receive an input to terminate the anonymous mode of a chat room and return to the general mode.

For example, the user terminal 100 may detect an input to terminate the anonymous mode of a chat room. For example, the user terminal 100 may detect an input to select a menu UI 446 from the display unit 403 of the display unit 403 of the user terminal 100. Accordingly, the chat room option menu 424 may be displayed on the user terminal 100. Then, the user terminal 100 may detect an input to select an UI 448 for terminating the anonymous mode of a chat room. When the chat service providing apparatus 400 is included in the user terminal 100, the chat service providing apparatus 400 may receive the input detected by the user terminal 100 through a circuit in the user terminal 100.

When the chat service providing apparatus 410 is included in the chat service providing server 200, the chat service providing apparatus 410 may receive information about the user input transmitted by the user terminal 100, via the communication network 300.

Figure 8A:
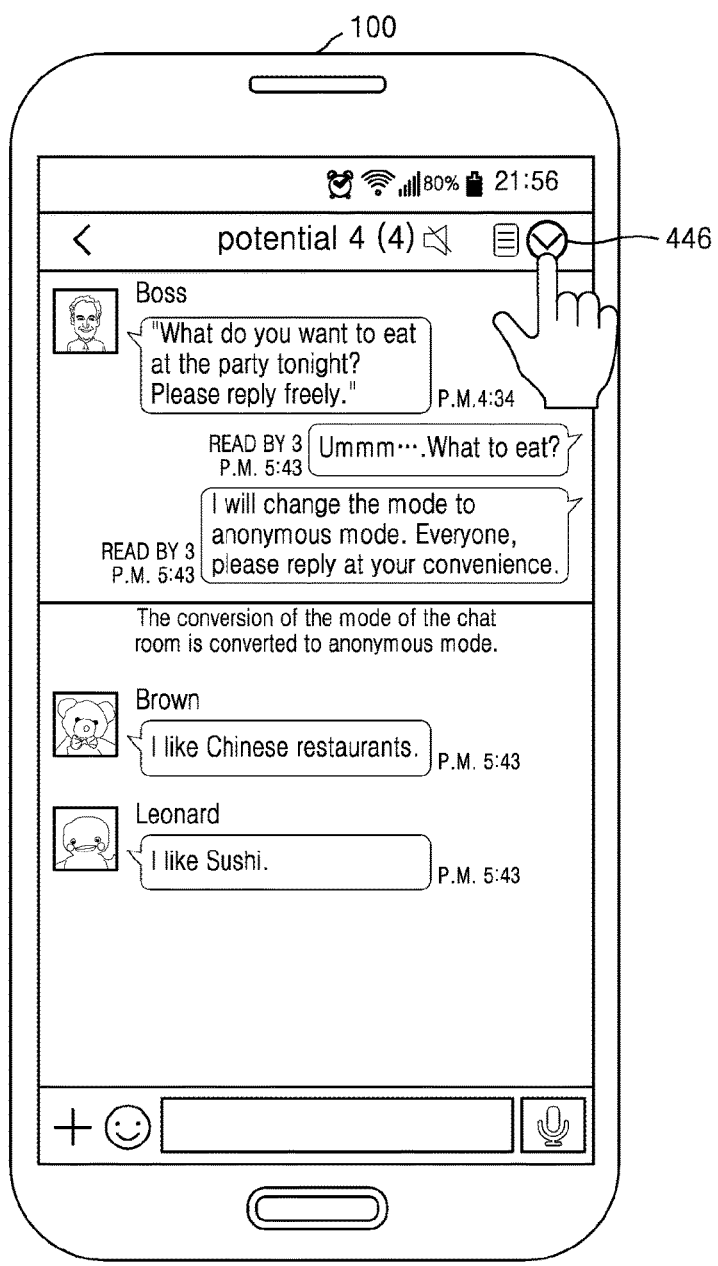
FIGS. 8A to 8D schematically illustrate examples of providing a chat service in a chat service providing apparatus according to various example embodiments.
Figure 8B:
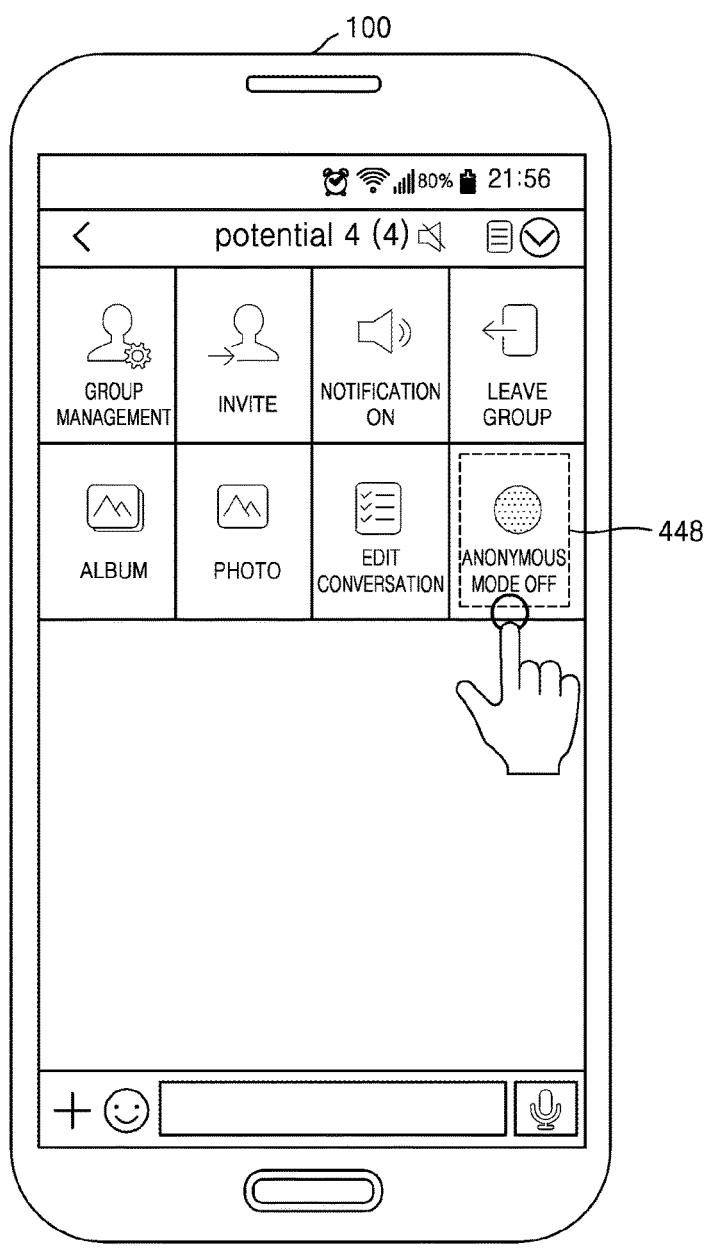
Figure 8C:
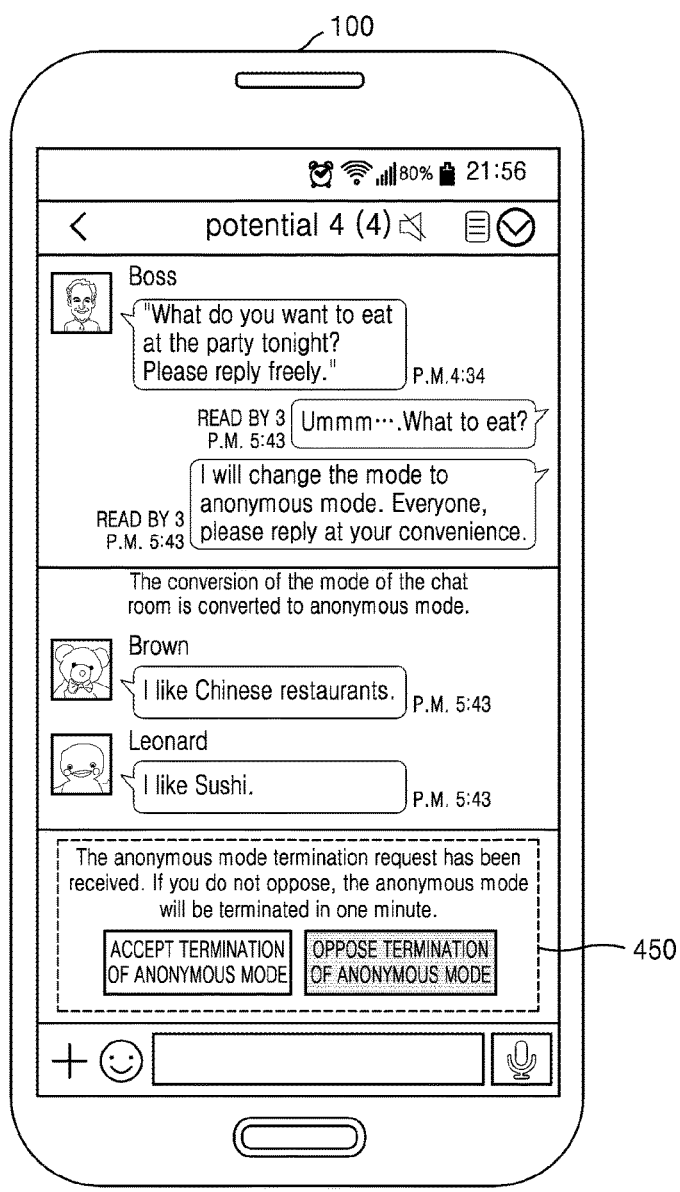

As illustrated in FIG. 8C, when an input to terminate the anonymous mode is received, the chat service providing apparatus 400 may display an UI for receiving opinions of approval or disapproval with respect to the termination of the anonymous mode, on the user terminal 100. For example, the chat service providing apparatus 400 may display on the user terminal 100 a fact that a request to terminate the anonymous mode has occurred through a UI 450 indicating that a request to terminate the anonymous mode is received. Also, the chat service providing apparatus 400 may display an UI for receiving opinions of approval or disapproval such as "ACCEPT TERMINATION OF ANONYMOUS MODE" and "OPPOSE TERMINATION OF ANONYMOUS MODE" in the UI 450 indicating that a request to terminate the anonymous mode is made.

In this state, the chat service providing apparatus 400 may consider all accounts that do not provide opinions of approval or disapproval after a predetermined (or, alternatively, a desired) time elapses to have provided approval or disapproval opinions. For example, the chat service providing apparatus 400 may display a message of "IF YOU DO NOT OPPOSE, THE ANONYMOUS MODE WILL BE TERMINATED IN ONE MINUTE" in the UI 450 indicating that a request to terminate the anonymous mode is received.

In some example embodiments, when no input of "ACCEPT TERMINATION OF ANONYMOUS MODE" or "OPPOSE TERMINATION OF ANONYMOUS MODE" is detected by the user terminal 100 after the set time, the chat service providing apparatus 400 may consider the account of the user terminal 100 to have provided an approval opinion. In this regard, the chat service providing apparatus 400 may terminate the anonymous mode of a chat room even when there is a participant in the chat room who does not check the chat room. In other example embodiments, the chat service providing apparatus 400 may prevent the termination of the anonymous mode of a chat room while there is a participant who does not check the chat room.

Figure 8D:
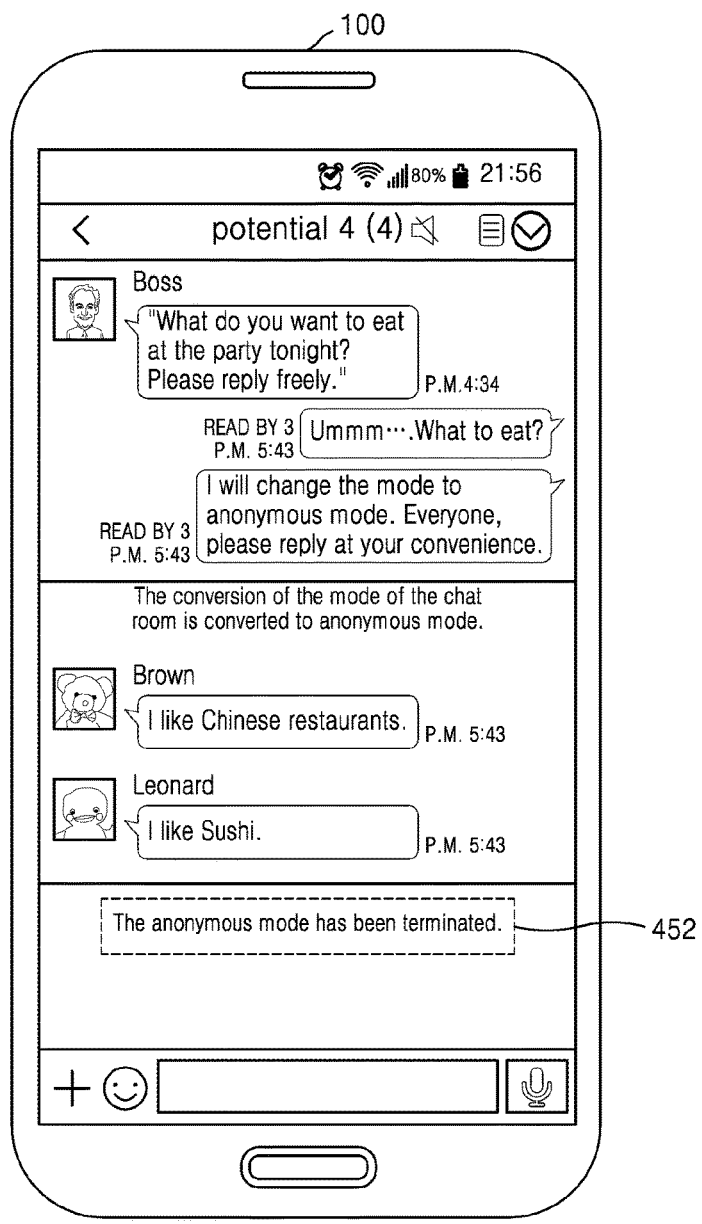

As illustrated in FIG. 8D, when the number of opinions approving the termination of the anonymous mode is over a second reference value, the chat service providing apparatus 400 may terminate the anonymous mode of a chat room and may convert the mode of a chat room to the general mode. In this case, the chat service providing apparatus 400 may display a message 452 indicating the termination of an anonymous mode on the user terminal 100. If the number of the opinions approving the termination of the anonymous mode is less than the second reference value, the chat service providing apparatus 400 may maintain the anonymous mode of a chat room. Also, the chat service providing apparatus 400 may omit displaying any of the opinions of approval or disapproval received from the user terminal 100 regarding the termination of the anonymous mode of a chat room, on the display unit 403 of the user terminal 100, or delete the opinion of approval or disapproval after a certain time passes from displaying of the opinion. Accordingly, the chat service providing apparatus 400 may prevent disclosure of the opinion of the user terminal 100 regarding the termination of the anonymous mode of a chat room.

When the input to terminate the anonymous mode is received, the chat service providing apparatus 400 may terminate the anonymous mode without receiving opinions of approval or disapproval with respect to the termination of the anonymous mode. In this state, the chat service providing apparatus 400 may terminate the anonymous mode after a predetermined (or, alternatively a desired) period of time elapses after receiving the input to terminate the anonymous mode, and convert the mode of a chat room to the general mode. For example, when receiving an input to terminate the anonymous mode from one of the accounts joining the chat room, the chat service providing apparatus 400 may terminate the anonymous mode after ten seconds from the time of receiving the input. Accordingly, the chat service providing apparatus 400 may prevent a case in which a participant in a chat room, who tries to transmit a message to the chat room in an anonymous mode, unintentionally transmits the message to the chat room in a general mode because the anonymous mode of the chat room is suddenly terminated.

As such, the chat service providing apparatus 400 according to the above-described example embodiment, and the method of providing a chat service, may provide an anonymous mode in which identity of the user that transmitted a message is not disclosed, in a process of performing a multilateral chat using messages. Furthermore, the chat service providing apparatus 400 according to example embodiments embodiment, and method of providing a chat service may provide the functions of converting a mode of a chat room to an anonymous mode while the chat room is in a general mode, in which identity of one who transmits a message is disclosed, and converting the mode of the chat room to the general mode while the chat room is in the anonymous mode, in a process of performing a multilateral chat using messages.

As described above, according to the disclosure, an apparatus, method, and computer program for providing a chat service may provide an anonymous mode, in which an identity of a sender who transmitted a message is not disclosed, in a process of performing a multilateral chat using messages.

Furthermore, according to the disclosure, an apparatus, method, and computer program for providing a chat service may provide in a process of performing a multilateral chat using messages a function of converting a general mode, in an identity of which a sender who transmitted a message is disclosed, to the anonymous mode, during chatting, and converting the anonymous mode to the general mode during chatting.

The example embodiments can also be embodied as computer readable codes on a non-transitory computer readable recording medium. The non-transitory computer readable recording medium is any data storage device that can store data which can be thereafter read by a computer system. Examples of the non-transitory computer readable recording medium include hardware apparatuses specially configured to store and execute program commands, for example, magnetic storage media, e.g., hard disks, floppy disks, and magnetic tapes, optical recording media, e.g., CD-ROMs and DVDs, magneto-optical medium such as optical disks, and ROM, RAM or flash memory. The non-transitory computer readable recording medium can also be distributed over network coupled computer systems so that the computer readable code is stored and executed in a distributed fashion. Also, functional programs, codes, and code segments for accomplishing the disclosure can be easily construed by programmers of ordinary skill in the art to which the disclosure pertains. Furthermore, the medium may include intangible medium implemented to be capable of transmitting on a network. For example, the medium may be implemented in the form of software or application so as to be transmitted and distributed via a network.

The computer program may be specially designed and configured for the disclosure or may be well-known to one skilled in the art of computer software, to be usable. An example of a computer program may include not only machine codes created by a compiler but also high-level language codes executable by a computer using an interpreter.

The particular implementations shown and described herein are illustrative example embodiments and are not intended to otherwise limit the scope of the example embodiments in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the example embodiments unless the element is specifically described as "essential" or "critical."

It should be understood that example embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of facilitating electronic communication of at least a first message between a plurality of accounts including a first account and a plurality of outside accounts, the method comprising:
   receiving a request to convert a mode of a chat room to an anonymous mode;
   receiving first voting information from the plurality of accounts, the first voting information indicating whether a user associated with a respective one of the plurality of accounts approves the anonymous mode;
   determining whether a number of the plurality of accounts or a ratio of the plurality of accounts that approve the anonymous mode is greater than or equal to a first reference value based on the first voting information;
   converting the mode of the chat room to the anonymous mode by matching each of a plurality of temporary accounts with a respective one of the plurality of accounts, in response to determining that the number of the plurality of accounts or the ratio of the plurality of accounts is greater than or equal to the first reference value; and
   displaying the first message from an account of the plurality of accounts in the chat room with an indication of which of the plurality of the temporary accounts is associated with the account, in response to the first message being received from one of the plurality of accounts.

2. The method of claim 1, further comprising:
   creating the chat room such that the chat room facilitates the electronic communication of the first message between the plurality of accounts.

3. The method of claim 1, further comprising:
   redistributing the plurality of temporary accounts, in response to a new account joining the chat room.

4. The method of claim 3, wherein the redistributing comprises:
   releasing a correspondence relationship between the plurality of accounts and the plurality of temporary accounts;
   increasing a number of the plurality of temporary accounts; and
   matching each of the new account and the plurality of accounts with respective ones of the plurality of temporary accounts.

5. The method of claim 1, further comprising:
   determining whether one of the plurality of accounts exits the chat room; and
   setting a new correspondence relationship between each of the plurality of accounts remaining in the chat room and the plurality of temporary accounts, in response to one of the plurality of accounts exiting the chat room.

6. The method of claim 1, further comprising:
receiving a request to terminate the anonymous mode from any one of the plurality of accounts;
converting the mode of the chat room to a general mode, in response to receiving the request to terminate the anonymous mode;
receiving, in the general mode, a second message from a transmitting account of the plurality of accounts; and
displaying, in the general mode, the second message along with an indication of the transmitting account in the chat room.

7. The method of claim 6, wherein the converting comprises:
receiving second voting information from the plurality of accounts, the second voting information indicating whether a user associated with a respective one of the plurality of accounts approves terminating the anonymous mode;
determining whether a number of the plurality of accounts or a ratio of the plurality of accounts that approve termination of the anonymous mode is greater than or equal to a second reference value based on the second voting information; and
terminating the anonymous mode, in response to determining that the number of the plurality of accounts or the ratio of the plurality of accounts is greater than or equal to the second reference value.

8. The method of claim 7, wherein the terminating comprises:
terminating the anonymous mode after a first reference time period elapses after receiving the request to terminate the anonymous mode.

9. The method of claim 6, further comprising:
receiving one or more parameters from the one of the plurality of accounts requesting termination of the anonymous mode, the one or more parameters including at least one of a duration time of the anonymous mode and whether to disclose which of the plurality of accounts generated the first message in the anonymous mode when the anonymous mode is terminated.

10. The method of claim 1, wherein, the determining comprises:
incrementing the number of the plurality of accounts that approve the anonymous mode based on the plurality of accounts that do not provide the first voting information within a second reference time.

11. The method of claim 1, wherein the determining comprises:
incrementing a number of the number of the plurality of accounts that disapprove the anonymous mode based on the plurality of accounts that do not provide the first voting information within a second reference time.

12. The method of claim 1, wherein the converting comprises:
at least one of generating and receiving the plurality of temporary accounts and an indication of which of the plurality of temporary accounts correspond to the plurality of accounts.

13. The method of claim 1, wherein,
the converting converts the plurality of accounts to the plurality of temporary accounts such that each of the plurality of temporary accounts is in a one-to-one correspondence with each of the plurality of outside accounts and the first account, and
the displaying displays the first message in the chat room such that an indication of which of the plurality of temporary accounts is associated with the account that transmitted the first message is displayed in the chat room.

14. The method of claim 1, wherein the displaying displays the first message in the chat room such that the first message and subsequent messages created by other ones of the plurality of accounts are aligned in a same direction on each of user terminals associated with the plurality of accounts.

15. A non-transitory computer readable recording medium having recorded thereon a program, which when executed by a computer, configures the computer to,
receive a request to convert a mode of a chat room to an anonymous mode;
receive first voting information from the plurality of accounts, the first voting information indicating whether a user associated with a respective one of the plurality of accounts approves the anonymous mode;
determine whether a number of the plurality of accounts or a ratio of the plurality of accounts that approve the anonymous mode is greater than or equal to a first reference value based on the first voting information;
convert the mode of the chat room to the anonymous mode by matching each of a plurality of temporary accounts with a respective one of the plurality of accounts, in response to determining that the number of the plurality of accounts or the ratio of the plurality of accounts is greater than or equal to the first reference value; and
display the first message from an account of the plurality of accounts in the chat room with an indication of which of the plurality of the temporary accounts is associated with the account, in response to the first message being received from one of the plurality of accounts.

16. A method of communicating messages in an instant messaging environment, the method comprising:
tallying a first approval rate amongst a plurality of users to switch the instant messaging environment into an, anonymous mode;
determining whether the first approval rate is above a first threshold; and
in response to the first approval rate being greater than or equal to the first threshold, anonymizing the instant messaging environment by,
generating a number of unique temporary accounts,
assigning each of the plurality of users within the instant messaging environment with one of the unique temporary accounts,
associating the messages from each of the plurality of users with respective ones of the unique temporary accounts, and
displaying the messages in the instant messaging environment such that a source of each of the messages is indicated with the respective ones of the unique temporary accounts.

17. The method of claim 16, further comprising:
receiving a request to switch the instant messaging environment to the anonymous mode from one of the plurality of users; and
receiving voting information from the plurality of users, wherein
the tallying tallies the first approval rate based on the voting information.

18. The method of claim 16, further comprising:
maintaining an identified mode in which the source of each of the messages is indicated as a respective one of the plurality of users, in response to the first approval rate being less than the first threshold.

19. The method of claim 16, further comprising:
re-anonymizing the instant messaging environment, in response to a new user joining the instant messaging environment operating in the anonymous mode, the re-anonymizing including,
  unassigning each of the plurality of users to one of the unique temporary accounts;
  increasing the number of the unique temporary accounts; and
  assigning each of the plurality of users and the new user within the instant messaging environment with one of the unique temporary accounts.

20. The method of claim 17, further comprising:
tallying a second approval rate amongst the users to exit the anonymous mode and switch to an identified mode in which the source of each of the messages is indicated as a respective one of the plurality of users;
determining whether the second approval rate is above a second threshold;
switching the instant messaging environment to the identified mode, in response to the second approval rate being greater than or equal to the second threshold; and
maintaining the anonymous mode, in response to the second approval rate is being less than the second threshold.

\* \* \* \* \*